(12) United States Patent
Lobbezoo et al.

(10) Patent No.: US 12,437,167 B2
(45) Date of Patent: Oct. 7, 2025

(54) INTELLIGENT CABINET (71) Applicant: Intelligent Fridges B.V., Nieuw Vennep (NL)

(72) Inventors: Leendert Willem Michiel Lobbezoo, Nieuw-Vennep (NL); Serge Robert Guy Kremer, London (GB)

(73) Assignee: Intelligent Fridges B.V., Nieuw Vennep (NL)

( * ) Notice: Subject to any disclaimer, the term of this patent is extended or adjusted under 35 U.S.C. 154(b) by 0 days.

(21) Appl. No.: 18/002,490

(22) PCT Filed: Jun. 8, 2021

(86) PCT No.: PCT/EP2021/065347
§ 371 (c)(1),
(2) Date: Dec. 20, 2022

(87) PCT Pub. No.: WO2022/002538
PCT Pub. Date: Jan. 6, 2022

(65) Prior Publication Data
US 2023/0229874 A1    Jul. 20, 2023

(30) Foreign Application Priority Data
Jun. 30, 2020 (GB) .................................... 2010025

(51) Int. Cl.
*G06K 7/10* (2006.01)
(52) U.S. Cl.
CPC ..... *G06K 7/10336* (2013.01); *G06K 7/10297* (2013.01)

(58) Field of Classification Search
CPC ............ G06K 7/10336; G06K 7/10297; F25D 23/065; F25D 2323/06; F25D 29/00
See application file for complete search history.

(56) References Cited

U.S. PATENT DOCUMENTS

| | | | |
|---|---|---|---|
| 7,262,698 B1 * | 8/2007 | Frederick ............ | G07F 17/0092 340/5.32 |
| 7,889,082 B2 * | 2/2011 | Bauchot ................. | G06Q 10/06 235/385 |
| 9,349,238 B2 * | 5/2016 | Tkachenko ........ | G06Q 30/0202 |
| 11,501,594 B2 * | 11/2022 | Dai ........................ | G06Q 20/18 |

(Continued)

FOREIGN PATENT DOCUMENTS

| | | |
|---|---|---|
| CN | 209028685 U | 6/2019 |
| WO | 2019/218003 A1 | 11/2019 |

OTHER PUBLICATIONS

CN 209028685 translation (Year: 2025).*

*Primary Examiner* — Daniel J Rohrhoff
(74) *Attorney, Agent, or Firm* — Ipsilon USA—NLO (57) ABSTRACT An intelligent cabinet for dispensing products contained therein that includes an outer wall, an inner liner defining an enclosed interior space adapted for housing an inventory of items, an intermediate layer provided between the outer wall and inner liner, and having a plurality of slots, and a system of modular cassettes including a plurality of cassettes where each cassette is adapted to be fittingly received in and removable from a corresponding slot from the plurality of slots, and a plurality of RFID antennas, where each RFID antennas is separately housed in one of the cassettes from among the plurality of cassettes.

20 Claims, 7 Drawing Sheets

(56) References Cited

U.S. PATENT DOCUMENTS

| | | | |
|---|---|---|---|
| 11,694,501 B2* | 7/2023 | Friend | G07F 9/026 |
| | | | 700/236 |
| 2010/0328037 A1* | 12/2010 | Thomas | F25D 29/00 |
| | | | 340/10.1 |
| 2015/0377544 A1* | 12/2015 | Nelson | G01K 1/024 |
| | | | 374/117 |
| 2017/0196128 A1 | 7/2017 | Elizondo, II | |
| 2018/0372398 A1* | 12/2018 | Cosgrove | G16H 20/13 |

* cited by examiner

INTELLIGENT CABINET

FIELD OF THE INVENTION

The present disclosure concerns intelligent cabinets, particularly for use with unmanned, cashless, no-checkout retailing, that employ radio frequency identification (RFID) technology to identify and monitor inventory in real-time.

BACKGROUND

Vending machines are well-known and typically involve some form of secured enclosure that contains an inventory of products dispensable from the machine in combination with some form of payment scheme (e.g., cash or contactless). Some vending machines are further adapted for automatic monitoring of the inventory, for example, by employing radio frequency (RF) identification of the products through the use of smart (RF) tags, RF antennas, and RF readers.

U.S. Pat. No. 7,053,773 describes a vend audit system and method for tracking inventory in a vending machine. Smart (RF) tags are provided on products in the vending machine. The respective spirals of each dispenser are configured as antennas that read the RF tags. Products in one dispenser generate a signature signal different from products in other dispensers. The signature signals are used to determine if the dispensers are loaded with the correct items and quantity of products.

U.S. Pat. No. 9,349,238 describes a vending kit for controlling access to products from a vending machine that includes, in combination with other features, a radio antenna, a radio frequency identification reader, and a processor that records an initial inventory of products, authenticates a cashless payment mechanism, triggers a locking mechanism, records a final inventory of products, and initiates a payment for a difference between the initial and final inventories. The vending machines includes a kiosk that contains the inventory of products and a housing that is installed onto an external surface of the kiosk. The radio antenna is installed within the kiosk.

Although RF technology has been previously applied in vending machine systems for the purpose of identifying and/or monitoring the dispensable contents, there are a number of considerations to be made when configuring such a system. Aspects that may impact the RF functionality include, but are not limited to, the static positioning of the products and/or RF tags within the vending machine, dynamic positioning of the products and/or RF tags relative to the vending machine, randomized orientation of the products and/or RF tags, the density of the number of RF tags in the enclosure of the vending machine, the types of products (e.g., liquids, food items) contained in the vending machine, the types of packaging of the products (e.g., aluminium cans, plastic wrappers, paper cartons), the climate of the vending machine interior (e.g., heated, cooled, humid), the materials used in the construction of the vending machine structure, the geographic location of the vending machine, and/or the discreteness of the reading field (e.g., 100% interior read, 0% exterior read). In particular, it is well understood that the dielectric values of items within a sensed area will have a significant effect on the ability of an RFID system to accurately read RFID tags.

For vending machines that employ RF technology for monitoring the inventory, such as those described in U.S. Pat. Nos. 7,053,773 and 9,349,238, the RF equipment is typically integrated into the vending machine in one of two ways. Generally, at least the RF antenna(s) is/are located in an interior of the vending machine in relative proximity to the RF tags/products to be dispensed. The antennas may be integrated into another structural component of the vending machine (e.g., the spiral of the dispenser) such that it is essentially in contact with RF tags/products or disposed on an interior surface of the vending machine (e.g., affixed or installed above a shelve(s) of products). Alternatively, the RF equipment, including any RF antenna(s), can be integrated together as a unit into a door of the vending machine. This particular configuration has been used to upgrade existing vending machines to incorporate automatic monitoring of the inventory by retrofitting the machines with an RF-equipped door.

These systems, however, are not without disadvantages. Positioning of the RF antennas in an interior of the vending machine where the RF tags/product is also located can be problematic for a number of reasons, such as the previously listed considerations for implementing RF identification technology. Interference with the signals can result from the positioning/orientation of the RF tags, the number of RF tags, and the types of products and their respective packaging. Even more so, the climate of the interior of the vending machine, whether it is cooled, heated, or room temperature, can degrade the quality of the RF antenna over time. RF equipment is typically costly and as such there is a need to protect it so that its lifespan can be extended as long as possible.

The components of the RF system are often integrated into these vending machines as a unit. This can create accessibility issues when the RF equipment malfunctions and requires repair and/or replacement. Particularly, for vending machines that are retrofitted with an RF equipped door, the entire door may need to be removed and taken apart simply to repair one particular component or in some cases may even require replacement of the entire door. Similarly, for RF equipment that is disposed in an interior of the vending machine, repair and/or replacement of the components may require a specialized technician and is likely to result in a period of downtime in the vending machine's service.

The interior climate of a vending machine may also pose challenges for the RF equipment and other contents. For example, the presence of moisture in the environment can interfere with the functionality and/or damage RF equipment when in contact therewith. Moisture can also be a concern because it can encourage bacterial growth in the vending machine, which raises hygienic concerns for the products, particularly food items, and therefore consumer safety issues.

SUMMARY OF THE INVENTION

The present invention relates to intelligent cabinets that are adapted to identify and monitor an inventory of items that are capable of being dispensed therefrom. These intelligent cabinets are equipped with a system of modular cassettes designed to house RFID antennas, such that the aforementioned disadvantages may be minimized if not entirely avoided. The present invention also relates to a cassette for installation in an intelligent cabinet.

It is to be understood that the intelligent cabinets as described herein may be adapted for vending an inventory of items contained therein. In the context of the present disclosure, the term intelligent cabinet may be interchangeably interpreted as a vending machine. However, it is also to be understood that it is not an explicit requirement that the inventory of items contained in the intelligent cabinets described herein are in fact sold by way of a financial transaction. It should also be noted, in terms of capacity, that the intelligent cabinets of the present disclosure generally have an interior volume of between 50 L and 750 L, and preferably between 100 L and 450 L.

An intelligent cabinet for dispensing products contained therein is provided comprising an outer wall, an inner liner defining an enclosed interior space adapted for housing an inventory of items, the outer wall and inner liner being spaced apart by an intermediate layer provided therebetween and having a plurality of slots, a system of modular cassettes comprising a plurality of cassettes, wherein each cassette is adapted to be fittingly received in and removable from a corresponding slot from the plurality of slots, and a plurality of RFID antennas, where each RFID antenna is separately housed in one of the cassettes from among the plurality of cassettes. Reference is given here and throughout the specification to RFID components and RF technology. Nevertheless, the principle is intended to apply to any system of detection that can be used to detect and/or register items within the cabinet by use of a detecting device located within the mentioned cassettes. The intelligent cabinet also comprises a door that is preferably hingedly or slidingly connected to a front side of the cabinet to provide access to the enclosed interior space.

The intelligent cabinet has a front side and a back side, where the inventory of items are accessible from the front side and the plurality of cassettes are accessible from the back side. Having separate access points in respect of the intelligent cabinet for the inventory of items and the RFID equipment is desirable because in the event, for example, that an RF antenna requires adjustment, repair, or replacement, the cassette in which the problematic RF antenna is contained can easily be removed from the back of the intelligent cabinet for servicing with minimal or essentially no impact to the operation of the intelligent cabinet. In other words, access to the inventory of items is minimally or not at all impaired so that product vending may continue.

In an embodiment, the intelligent cabinet further comprises a main cassette containing an RFID reader. The main cassette may be mounted on or affixed to the back side of the intelligent cabinet, preferably in a centralized region of the intelligent cabinet. In this regard, the main cassette is equally accessible along with the plurality of cassettes from the back side of the intelligent cabinet. Further, since all of the RFID antennas are each separately housed in each of the plurality of cassettes positioning the main cassette in a central region of the back side of the cabinet may provide each cassette with a relatively similar range of access to the main cassette for connection to the RFID reader. This configuration further facilitates that the RFID antenna cables can be easily bundled and/or tethered together neatly at the back of the intelligent cabinet. Further, is it desirable that there be sufficient space present at the back of the intelligent cabinet to dispose additional components, including by not limited to, a multiplexer, any one or more cable connections, and/or an LED driver.

RF equipment is not designed to withstand climatic variation. Specifically, heat, cold, and/or moisture can negatively impact the functionality and lifespan of the equipment. The modular system of cassettes provided in the intelligent cabinets of the present invention therefore protect the RFID equipment contained therein from these potential environmental conditions, and by extension may advantageously extend the lifespan of these costly components and reduce, if not eliminate, interference and/or errors in the functionality of the RFID equipment.

Also, for existing vending machines in which the RF equipment is mounted to an interior of the machine, installation of the RF equipment in the vending machine has the potential to cause damage to the interior, for example, by drilling of holes to properly secure the equipment to the interior. This can have detrimental effects on the vending machine, especially where the interior is a climate controlled environment, because the additional holes can result in a reduction of the insulation and/or cooling of the interior. Further, these holes may introduce bacterial growth into the vending machine, which is undesirable, especially when the product inventory includes food items. Providing the plurality of cassettes in a corrugated layer of the intelligent cabinet avoids these disadvantages.

Providing a plurality of cassettes has the advantage of protecting the RFID antennas contained therein from the climate of the cabinet. The cassettes also permit the RF equipment to be added to the intelligent cabinets without the risk of structural damage because no physical modification to the structure, e.g., drilling of holes, is required to mount the equipment in the intelligent cabinet. The cassettes are designed to be fittingly received in the slots of the intermediate layer that are pre-formed during manufacture.

Moreover, the modularity of the cassettes provides a number of advantages. The cassettes facilitate uniformity and modularity in positioning of the RF equipment in the intelligent cabinets, which saves on cost. It is also faster and easier to install the RF equipment compared to cabinets without a plurality of cassettes, and no specialized knowledge or competence is needed to perform the installation. The cassettes are precisely located in the slots and will not move. The cassettes are removable from their respective slots, which permits easy and discrete access to the contents for adjustment, repair, or replacement. Because each RFID antenna is separately housed in one cassette, the intelligent cabinet may still remain operational when one RFID antenna is being serviced. In some embodiments, a protrusion, grip, handle, or the like may be optionally provided on the cassette to facilitate insertion and removal of the cassette from a slot in the corrugated layer. Additionally or alternatively, rails may be provided in the plurality of slots to facilitate the fitting engagement of the cassettes. Moreover, the cassettes are generally dimensioned to have an interior space that accommodates a wide variety of RF equipment and/or additional sensors. This configuration further promotes standardization of the overall intelligent cabinet by promoting the likelihood that a given RF component and/or sensor, regardless of its geographic origin, can be accommodated in the cassettes.

In an embodiment, each cassette of the plurality of cassettes comprises at least one through hole dimensioned to accommodate an RFID antenna cable. Each RFID antenna is wired to the RFID reader in the main cassette via an RFID antenna cable. Providing a small hole in each cassette through which the antenna cable is configured to pass further provides a particular directionality of the cable (towards the main cassette), which facilitates an orderly bundling of the plurality of RF antenna cable together at the back side of the intelligent cabinet.

In an embodiment, each cassette from a metallic material, preferably stainless steel. Stainless steel is a preferred material for forming the cassettes because it can have the effect of strengthening the RFID signal of the antennas in the intelligent cabinet. This in turn increases the accuracy of the reading of the RF tags on products contained within the intelligent cabinet. It is further preferable that a front side of the cassette, which is the side facing the inner liner and enclosed interior space, is an open side. In this regard, the RFID antenna and/or additional sensor disposed in an interior space of the cassette is not obscured by an additional layer of material. Stated differently, there is no material disposed between the RFID antenna and/or additional sensor and the inner liner.

In an embodiment, where each cassette is formed of stainless steel, the preferred thickness of the stainless steel is between 0.3 mm and 0.7 mm, and more preferably about 0.5 mm. The thickness of the material forming the cassette may impact the level of insulation, particularly in embodiments where the intermediate layer is an insulating layer. A thick material means that the cassette will occupy a larger volume in the corrugated layer, which by extension, means that there is less room for the insulating material to occupy in the intermediate layer. Stainless steel having a thickness of about 0.5 mm is preferred for balancing the amount of space the cassettes may occupy without substantially reducing the insulation efficacy of the intermediate layer.

In an embodiment, the plurality of cassettes are positioned in the plurality of slots such that a space between the RFID antennas and the inner liner is 2 cm or less, preferably about 1 cm. The amount of space between the RFID antennas contained within the cassettes and the inner liner may impact the RFID signal quality. Spacing between the RF antennas and inner cabinet of around 1 cm provides a minimal amount of RF signal interference/degradation.

In an embodiment, the intermediate layer comprises a foam, preferably a high density foam that comprises cyclopentane. One particular example is an insulation foam comprising Lupranate® M20s and cyclopentane, though it is contemplated that any standard insulation foam or equivalents thereof may be used. A high density foam is particularly advantageous for maximizing the volume of insulation layer, which is particularly useful for insulating refrigerators and freezers. The foams comprising cyclopentane are desirable because they do not contain hydro-fluorocarbons (HFCs). Moreover, using these cyclopentane containing foams may result in significant reductions in equivalent $CO_2$ emissions so it is more environmental friendly then other polyurethane foams typically used for insulating refrigerators and freezers. In some embodiments the intermediate layer may be an insulation layer, particularly when the enclosed interior space is a temperature-controlled environment; however, in some embodiments the intermediate layer is not an insulating layer, but may nevertheless comprise foam material as described herein.

In an embodiment, additional foam insulation is provided in one or more of the plurality of cassettes, the additional foam being disposed adjacent to the RFID antenna in the cassette. Additional foam may be added to one or more of the cassettes in order to compensate for a reduction in the efficacy of the insulation layer in which the cassettes are disposed. The larger the cassettes, the less space there is available in the intermediate layer to provide insulation. Providing additional foam within the cassettes can assist in offsetting the reduction of available space for insulating material that would otherwise be present were a lesser number or smaller sized cassettes provided.

In an embodiment, the intelligent cabinet has opposing left and right sides and the plurality of cassettes are preferably evenly divided such that the number of cassettes positioned on the left side is equal to the number of cassettes positioned on the right side. Providing an equal number of cassettes on either side intelligent cabinet can provide balance in the transmission and reception of RF signals across the intelligent cabinet, which can by extension, reduce or minimize potential signal interference across the inner cabinet. The number of cassettes is primarily limited by size and space of the cabinet and may be any discrete integer, even or odd.

In an embodiment, the plurality of cassettes comprises at least eight cassettes. Though the number of cassettes is primarily limited by the size and shape of the intelligent cabinet into which the cassettes are dimensioned to be inserted, it has been found that having four cassettes on each of the left and right opposing sides of the intelligent cabinets functions particularly well, when considering a number of factors, which may include cost, size, shape, and signal quality.

In an embodiment, the plurality of cassettes comprises around 50% or less, preferably 25-50%, or more preferably 35% of a total surface area of the intermediate layer. Since the cassettes are disposed in the intermediate layer, which in some embodiments comprises an insulation layer, there must be a balance between the amount of space the cassettes occupy and the amount of space reserved for the insulation material. The more space the cassettes occupy in the less room there is available for the insulating material. When the cassettes do not occupy a surface area greater than 50% of the intermediate layer, a substantial reduction in the efficacy of the insulating properties of the insulating and/or sealing layer is not observed.

In an embodiment, additional foam is provided in the plurality of cassettes to offset a reduction in the total volume of the intermediate layer, preferably when the intermediate layer is an insulation layer. It is preferred that the reduction in the total volume of the intermediate layer is less than 20%, and even more preferably less than 12%.

Importantly, the cassettes may extend in the depth direction of the cabinet over a significant part of the overall depth. This is important to ensure that the signal is distributed throughout the cabinet and not limited or concentrated in the rear portion thereof. In particular, the slots may extend over more than 50% of the depth of the cabinet or more than 70% or more than 80% or even more than 90% of the depth. Preferably, the slots do not penetrate through to the front of the cabinet i.e. the slots form blind holes. The cassettes may be sized correspondingly, to fill the slots entirely or may be marginally shorter than the depth of the slots.

In an embodiment, the plurality of cassettes further comprises a first additional cassette positioned at a top end of the back side of the intelligent cabinet and/or a second additional cassette positioned at a bottom end of a back side of the intelligent cabinet, the first and second additional cassettes preferably being positioned in a central portion of the respective top and bottom ends of the back side of the intelligent cabinet. Additional cassettes may be provided at the top and bottom ends of the back side of the cabinet to extend the RF signal coverage and/or sensing capacity in the intelligent cabinet. The additional cassettes may contain RF equipment and/or one or more additional sensors.

In an embodiment, the first additional cassette, the second additional cassette, and the main cassette are positioned along a central longitudinal axis (Y) of the intelligent cabinet. Positioning the first and second additional cassettes along the central longitudinal axis (Y) of the intelligent cabinet can extend and/or further balance the distribution of the RF signal coverage across the total volumetric space of the intelligent cabinet. It is further preferable that the main cassette is positioned in a centralized region, transversely and longitudinally, of the back side of the intelligent cabinet such that the cassettes have more or less equivalent access thereto for establishing a wired connection with the RFID reader contained in the main cassette.

In an embodiment, the intelligent cabinet comprises a temperature controlled environment. It is desirable to be able to control the climate of the inner cabinet within a particular temperature range, which can be tailored to the specific inventory of items contained within the enclosed interior space. The exemplary intelligent cabinets described herein are not intended to be limited to any particular temperature ranges, beyond material constraints. In this regard, it is conceivable that the temperature controlled environment can be any one of below freezing, cooled/refrigerated, room temperature, or heated. The inventory of items contained in the inner cabinet may dictate a requisite temperature range.

In an embodiment, the temperature controlled environment is one of a refrigerator, a freezer, or a heated cabinet. The intelligent cabinets described herein are not intended to be limited to any particular temperature range, other than those limited by material constraints.

In an embodiment, the intermediate layer further comprises a corrugated layer. The corrugated layer may be comprised of a metallic material. The metallic material is preferably a relatively thin sheet metal. Stainless steel is one preferred material because it readily withstands the high pressurized liquid foam that may be used to form the intermediate layer and does not deform during the manufacturing process. It has also been found, that stainless steel, with a thickness of between 0.3 mm and 0.7 mm, preferably around 0.5 mm is particularly useful for forming the corrugated layer.

In an embodiment, the inner liner is formed of a material that has a low shielding effect for the RFID field. Materials that have a low shielding effect are desirable because they generally have a minimal to no impact on the transmission and reception of RF signals to and from the enclosed interior space. By forming the inner liner of a material that has a low shielding effect, the RF signals may easily pass through the inner liner without observing an interference that otherwise may arise if the inner liner were formed of another material, such as a sheet metal.

In an embodiment, the inner liner comprises a plastic material, preferably a high impact polystyrene (HIPS). HIPS is one exemplary plastic material from which the inner liner can be formed. HIPS is a preferred material because it is a rigid plastic that does not cause interference with the RF signals and is cost effective. HIPS is also desirable from a food safety and/or hygienic standpoint because it prohibits bacterial growth. The inner liner is preferably formed from one continuous and/or seamless piece of material, but may also be assembled from separate walls or panels. Additionally, the inner liner may be formed with conventional molded grooves, rails and/or slots for receiving trays, shelving, drawers, or the like in the enclosed interior space which it defines.

In an embodiment, the outer wall of the intelligent cabinet comprises a metallic material. It is preferable to form the outer wall from a metal because a metal can provide strength and rigidity to the overall structure of the cabinet. Further, a metallic material is preferred to limit the RFID field such that it does not extend beyond the exterior surface of the intelligent cabinet. In this regard, a metallic outer wall may assist to prevent external interference(s) from breaching into the internal RFID field.

In an embodiment, one or more of the plurality of RFID antennas are circular polarized antennas. Circular polarized antennas are preferred because they can be disposed on different planes and/or at different heights than the products on which the RF tags are affixed. Furthermore, the RF antenna does not need to take account of the orientation of the RF tag.

In an embodiment, one or more of the plurality of RFID antennas are high gain antennas. High gain antennas are considered to be desirable because they have a high level of functionality in high density RF tag environments and likewise in environments that contain liquid and/or metal items, which can shield and/or obscure RF signals. RFID antennas that support worldwide frequency coverage, may be employed, so that the antennas do not need to be swapped in different geographic regions. However, region-specific antennas may be equally used without any difficulty and/or prejudice.

In an embodiment, the RFID reader is monostatic or bistatic. In a monostatic system, each antenna transmits and receives RF energy. A monostatic configuration is much more cost effective than a bistatic system because it requires a lesser number of antennas and RF cables, as each antenna switches between transmitting and receiving RF signals. Alternatively, a bistatic RFID configuration employs separate antennas and RF cables for the transmission and reception of signals and thus may be preferable where a faster processing time is desired.

In an embodiment, at least one of the plurality of cassettes comprises both an RFID antenna and/or one or more additional sensors. Additional sensors may be provided in the cassettes to extend the functionality of the intelligent cabinets. Due to the modular nature of the cassettes and easy accessibility from the back of the intelligent cabinet, users may easily switch out sensors and/or RFID antennas from the individual cassettes to customize the monitoring of the inventory of items contained within the enclosed interior space. Depending on the inventory content, there may be interest in monitoring temperature (e.g., to ensure that food contents do not spoil) when certain products are contained within the inventory of items and/or at other times there may be interest in monitoring a different parameter, such as the humidity of the enclosed interior space, which could have an impact on a different type of product and/or how it is or is not packaged in the inventory.

In an embodiment, the one or more additional sensors is a temperature sensor, pressure sensor, humidity sensor, an optical sensor, a camera, a light sensor, a laser, a motion sensor, a UV-c light, a radar sensor, an ultrasonic sensor, an audio sensor, one or more speakers, and/or a beamer. The additional sensors are not intended to be limited to any particular sensor, but rather, are intended to be easily interchangeable from the cassettes. In this regard, the intelligent cabinet has the capacity to monitor any number of parameters that may vary in importance depending, for example, on the type of products contained in the inventory. Additionally, the one or more additional sensors may further be employed to provide information to a user of the intelligent cabinet, for example, by product information, including but not limited to, expiration date, type of bottling and/or packaging, place of bottling and/or packaging, sale and/or discount information, allergen information, and/or allergen alerts.

Though the plurality of cassettes are adapted primarily for the purpose of housing monitoring equipment, such as the RFID equipment and/or additional sensors described herein, the cassettes are not intended to be necessarily limited to housing such items. Rather, it is contemplated that other equipment or components related to the intelligent cabinet, e.g., a locking mechanism, can likewise be placed in one or more of the cassettes.

In a further aspect of the present disclosure, an intelligent cabinet according to the present invention is manufactured by: providing in a mold, a corrugated layer comprising a plurality of slots, each slot dimensioned to fittingly receive a corresponding cassette; injecting a foam material through the mold against the back side of the corrugated layer to form an intermediate layer, the foam material forming an airtight seal with the back side of the corrugated layer; removing the intermediate layer from the mold and attaching an inner liner over the front side of the corrugated layer; and providing an outer wall over the intermediate layer such that exposed foam of the intermediate layer is entirely covered by the outer wall.

Alternatively, an intelligent cabinet according to the present invention can be manufactured by placing in a mold, the outer wall and the corrugated layer comprising a plurality of slots and the inner liner, the corrugated layer is arranged between the outer wall and the inner liner and a front side of the corrugated layer is in fitting engagement with the inner liner; injecting a foam material the space between the back side of the corrugated layer and the outer wall to form an airtight seal, and removing the composite structure from the mold. Utilizing a mold, injecting a foam material between the one or more layers held by the mold to create a composite layer structure with an airtight seal is standard practice, for example, in the manufacture of refrigerators. As such, the exemplary intelligent cabinets of the present disclosure are compatible with these existing methods. The skilled person will also understand that using a corrugated layer is a convenient manner of making multiple slots with a single component. Nevertheless, the slots may also be formed individually by providing appropriate individual portions of material against which the foam material can be moulded. It is also contemplated that an inner liner, with preformed slots on its outer side, could be used whereby the foam is applied directly to the outer surface thereof. It will be understood that many alternative manufacturing techniques may be applied to arrive at the same objective as defined by claim 1.

In another aspect of the present disclosure, a cassette for installation in an intelligent cabinet according to the present invention is provided comprising a front side, a back side, a top side, and a bottom side, the sides being connected by a wall forming a closed perimeter around a body of the cassette and forming an interior space, the interior space being adapted to receive an RFID antenna and/or an additional sensor, wherein the top side, bottom side, back side, and wall are formed of a metal, preferably stainless steel, the front side is at least partially open or formed from a material adapted to permit RF signals to be transmitted from and received into the interior space, and during use, the cassette is oriented such that the front side faces the inner liner and the back side faces the outer wall. In some embodiments, a protrusion, grip, handle, or the like may be optionally provided on the cassette to facilitate insertion and removal of the cassette from a slot in the corrugated layer.

In an embodiment, the cassette further comprises at least one through hole dimensioned to accommodate an RFID antenna cable. As previously mentioned, providing at least one through hole in the cassette may further facilitate the RFID antenna cables to be easily bundled and/or tethered together neatly at the back of the intelligent cabinet. A cable groove may be optionally provided in the cassette to facilitate the orientation and/or position of the RFID antenna cable.

In an embodiment, a quantity of insulating foam may be provided in an interior space of the cassette. Providing the additional foam may be desirable to offset a reduction in the total volume of the intermediate layer, particularly when the intermediate layer is an insulating layer.

BRIEF DESCRIPTION OF THE DRAWINGS

The present invention will be discussed in more detail below, with reference to the attached drawings, in which.

DESCRIPTION OF EMBODIMENTS

Figure 1:
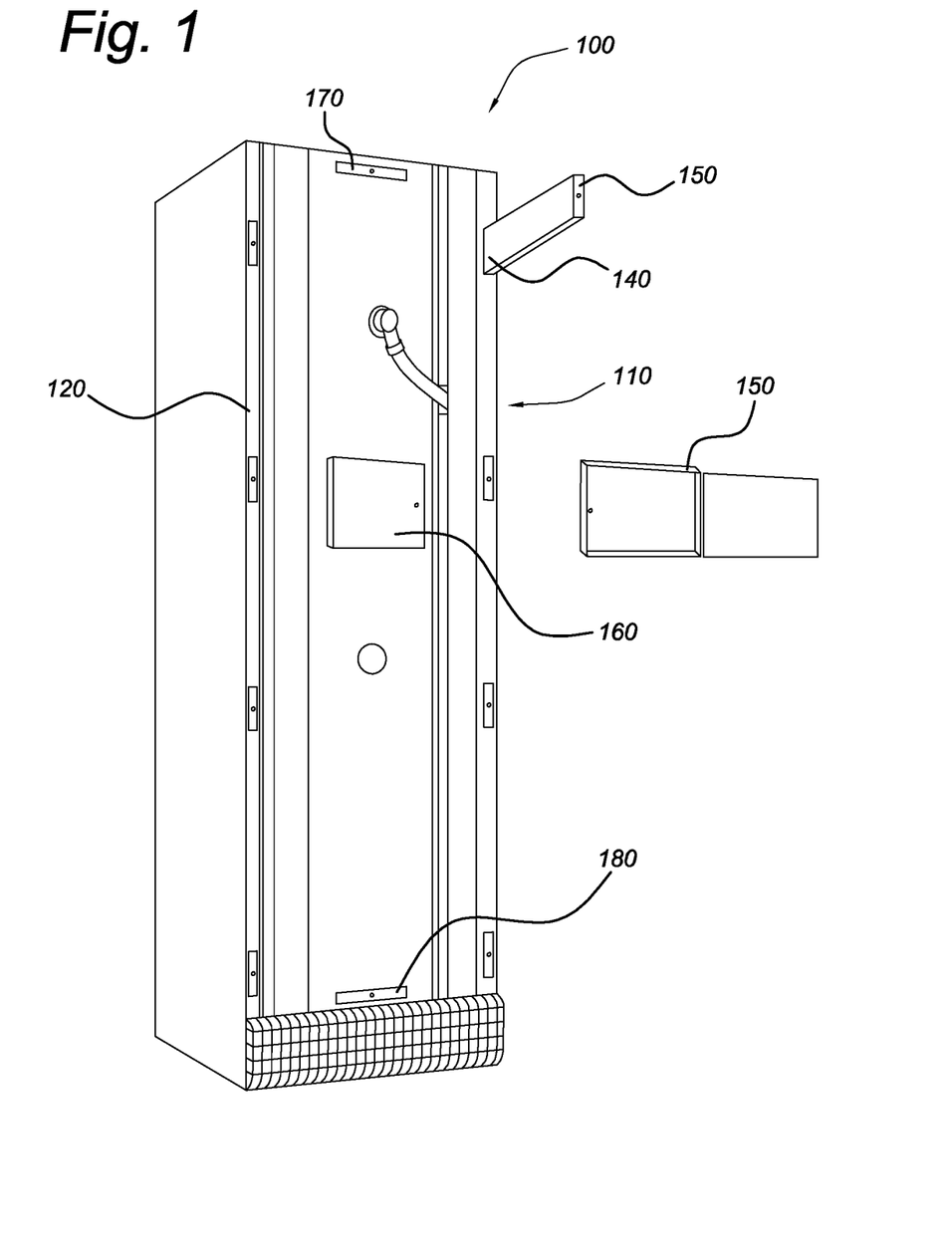
FIG. 1 shows a back view of an exemplary intelligent cabinet and cassette.
Figure 2:
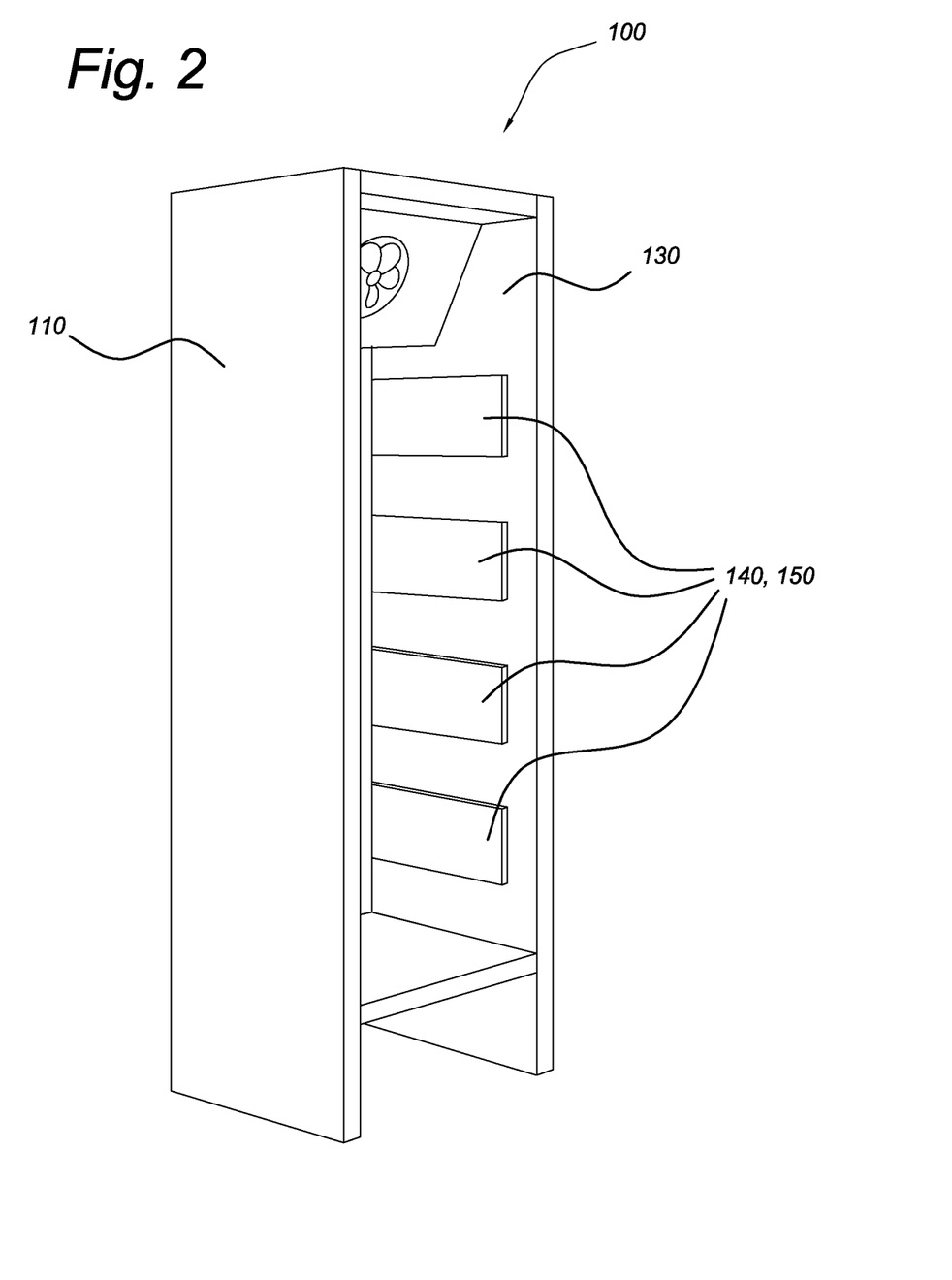
FIG. 2 shows a front side view of an interior of an exemplary intelligent cabinet.

The FIGS. 1 and 2 show an embodiment of an intelligent cabinet 100 according to the present disclosure. The intelligent cabinet 100 includes an outer wall 110, an intermediate layer 120, and an inner liner 130. Depending on the type of intelligent cabinet, e.g., one having a temperature controlled environment, such as a freezer, a refrigerator, or a heated cabinet, the materials used for forming the outer wall 110 may vary. In the present non-limiting example, the intelligent cabinet is a refrigerator-type cabinet in which the outer wall is formed from a metallic material, such as a sheet metal, and is preferably stainless steel. The sheet metal may be relatively thin, with a preferred thickness of about 0.5 mm.

The inner liner 130 defines an enclosed interior space (not shown in FIG. 1) that is adapted to house an inventory of items that may or may not be dispensed for vending. The front side of the intelligent cabinet has a door that is preferably hingedly or slidably connected to a side of the cabinet and is configured to provide access to the enclosed interior space. Like the outer wall 110, the material used for forming the inner liner 130 may vary depending on the type of intelligent cabinet. Materials that have a low shielding effect on the RFID field are desirable because they generally have minimal to no impact on the transmission and receipt of RF signals through the inner cabinet. In one non-limiting example, the intelligent cabinet is a refrigerator-type cabinet in which the inner liner is formed from a plastic material. Polystyrene plastic is one particular example of a plastic that may be used for forming the inner cabinet. Even more specifically, extruded impact modified polystyrene is an example of a preferred plastic. Plastic may be particularly beneficial for forming the inner liners of the intelligent cabinets of the present disclosure because plastic permits the RFID signals to pass, in contrast with metallic materials that may reflect the RFID signals. Though plastic may be preferred in forming the inner cabinet in some exemplary intelligent cabinets, it is further conceivable that other materials, such as sheet metal, may also be used.

Figure 3:
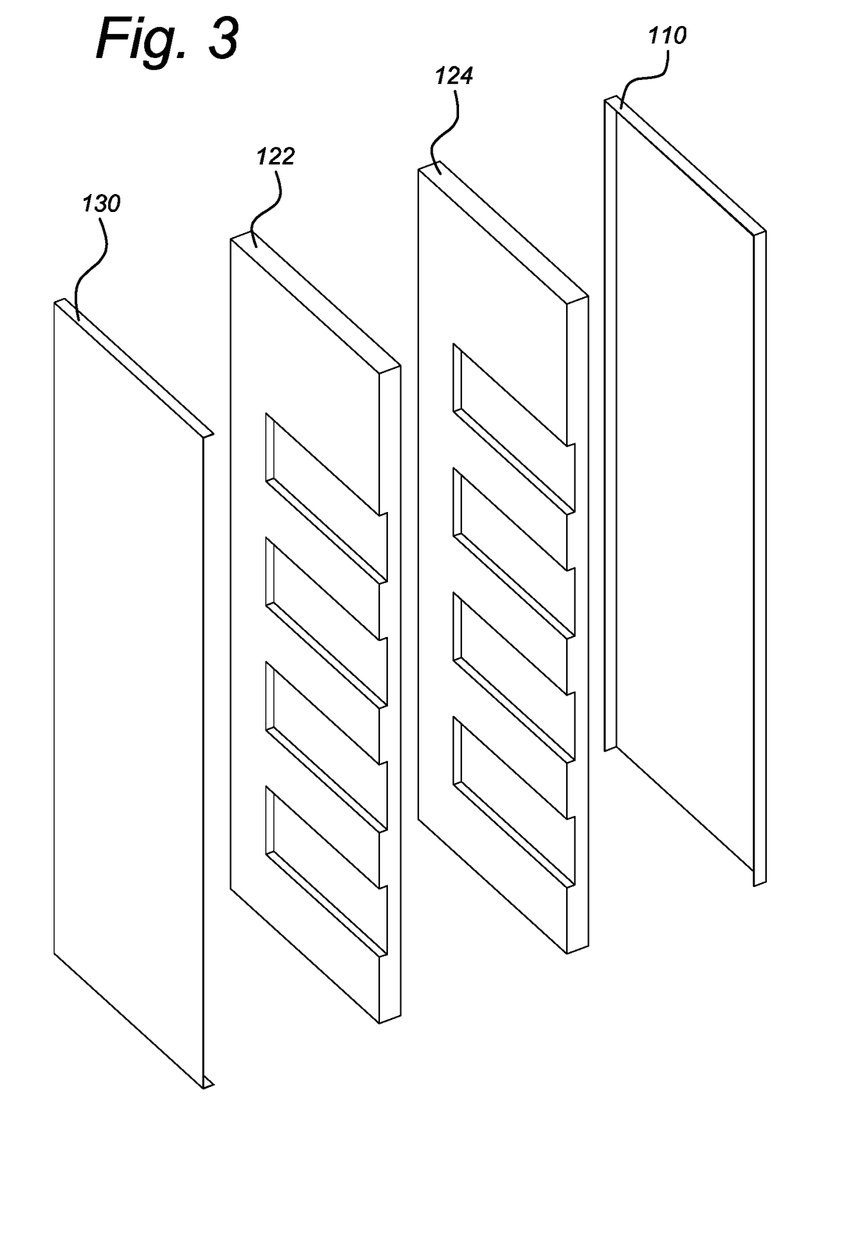
FIG. 3 shows an exploded cross-sectional view of one wall of an exemplary intelligent cabinet.
Figure 4A:
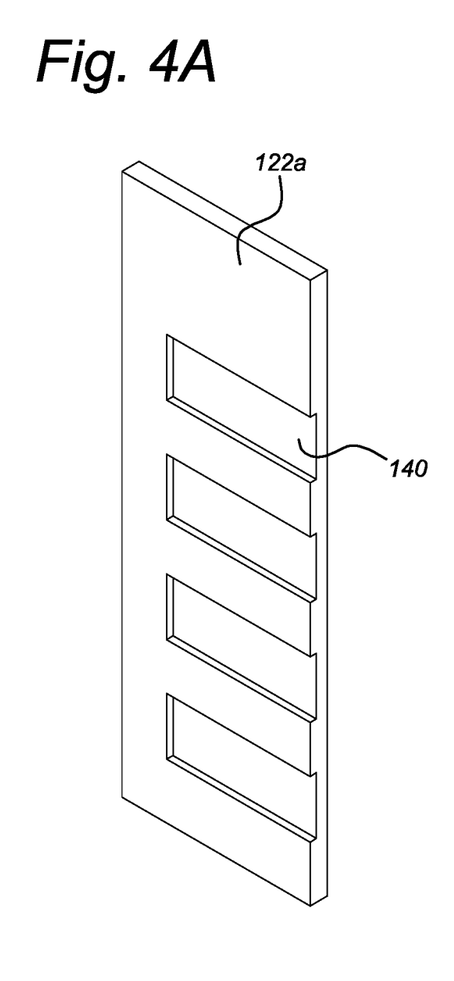
FIGS. 4A and 4B show front and back views of an exemplary corrugated layer.
Figure 4B:
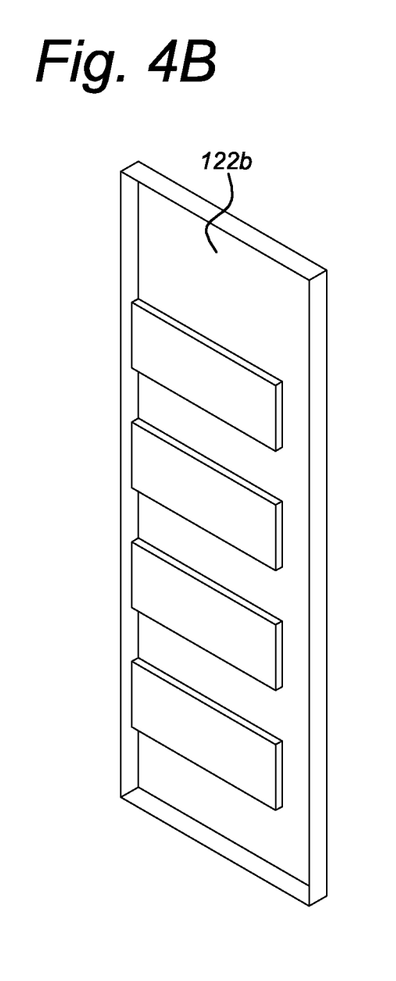

An exploded cross-section of the layers of one wall of an exemplary intelligent cabinet can be seen in FIG. 3. It will be understood that a cabinet may be built of individual walls or panels or may be moulded as a whole. Merely for the sake of simplicity, the present description of FIG. 3 is directed to an individual wall. Shown at the left, inner liner 130 is adjacent to the enclosed interior space adapted to house an inventory of products. The inner liner 130 is fitted over the front side 122a of the corrugated wall 122 which comprises the plurality of slots 140 into which corresponding cassettes 150 may be fittingly received. An exemplary corrugated wall 122 is shown in FIGS. 4A and 4B. A foam layer 124 is disposed adjacent to the back side 122b of the corrugated layer 122 and preferably forms an airtight seal therewith. The intermediate layer 120 preferably comprises a foam material and may be formed by injecting hot liquid foam against the back side of the corrugated layer during manufacture of the intelligent cabinet. The hot liquid foam will expand and set to form an airtight seal with the corrugated layer. Lastly, outer wall 110 covers the foam layer 124 and forms the exterior surface of the intelligent cabinet. It is preferable that the RFID field is not extended beyond the outer wall 110. As such, the outer wall is preferably formed of a material that may limit and/or reflect the RFID signals towards an interior of the intelligent cabinet.

Figure 5A:
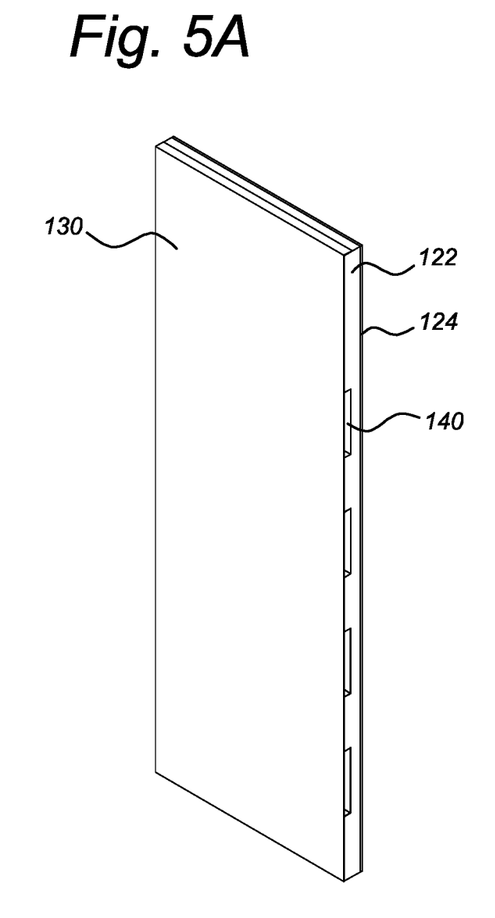
FIGS. 5A and 5B show cross-sectional views of a wall of an exemplary intelligent cabinet.
Figure 5B:
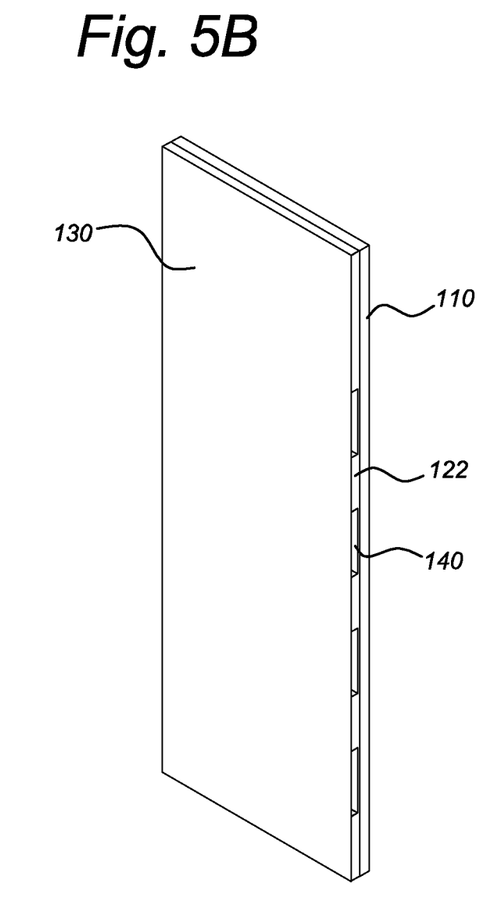

FIGS. 5A and 5B also show other cross-sectional views of one wall of an exemplary intelligent cabinet. Again, though a cabinet may be built of individual walls or panels or may be moulded as a whole, for the sake of simplicity, the description of FIGS. 5A and 5B is directed to an individual wall of an exemplary cabinet. FIG. 5A shows one wall of an intelligent cabinet without the outer wall 110. In the illustrated embodiment, the inner liner 130, preferably formed of a plastic material, is fit over the corrugated layer 122. Cassettes (not shown) may be inserted into slots 140 formed in the corrugated layer 122 and are preferably separated from the enclosed interior space of the intelligent cabinet only by the inner liner 130. Further, the foam layer 124 is provided adjacent to the back side of the corrugated layer. In this regard, the foam layer will not come into direct contact with the cassettes housed in slots 140 in the front side of the corrugated layer or with the inner liner 130. FIG. 5B shows a cross-section of a completed wall of an exemplary intelligent cabinet. Again, inner liner 130 is fit over corrugated layer 122, which carries the slots 140 for the cassettes (not shown). However, in FIG. 5B, outer wall 110 is disposed over the foam layer 124 (not shown) to form the exterior surface of the intelligent cabinet. In this regard, the exposed portion of the foam layer 124, as seen in FIG. 5A, is now entirely covered by the outer wall 110.

The number and size of the slots formed in the intermediate layer are subject to vary depending on the type, size, and shape of the intelligent cabinet to be provided. In other words, the number and size of the slots is freely customizable. In one non-limiting example, the plurality of cassettes comprises 50% or less of the total surface area of the intermediate layer. In other embodiments, the plurality of cassettes comprise 25-50%, preferably 35%, of the total surface area of the intermediate layer.

The quantity and type of inventory of the intelligent cabinet may also impact the number and size of slots. In one non-limiting example, four slots are provided on each of the left and right sides of the intelligent cabinet. This configuration is shown in FIG. 1. Although the number of slots is evenly divided between the left and right sides of the intelligent cabinet in one preferred embodiment, any combination of slots is conceivable.

Cassettes 150 are provided to precisely correspond with a respective slot 140 in the intermediate layer such that when the cassette is inserted into the slot it is fittingly received in an airtight engagement with the slot. In some embodiments, it is particularly desirable for the cassettes to form an airtight seal when inserted into a slot so that a reduction in the insulating properties of intermediate layer is minimized or avoided.

In terms of positioning within the intermediate layer, it is desirable for the transmission and reception of RF signals between the cassettes and the enclosed interior space that the distance between the slots and the enclosed interior space be minimized. Both the signal quality and the insulating capacity are considerations for determining an appropriate spacing. For example, placing the cassette at a greater distance may be beneficial for the RF signal, but it also means there will be less space for insulating material. In a non-limiting embodiment, the slots are formed in the intermediate layer so that a space between the RFID antennas and the enclosed interior space does not exceed 2 cm, and more preferably not greater than 1 cm.

Figure 6:
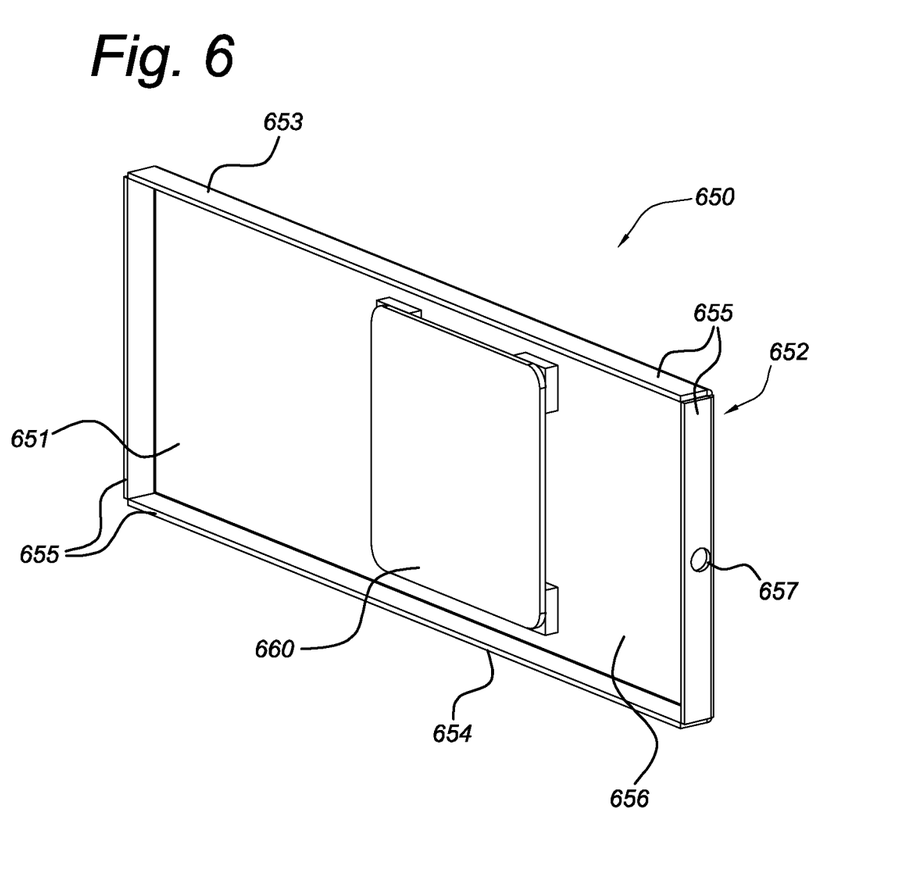
FIG. 6 is a front view of an exemplary cassette.

FIG. 6 shows an exemplary cassette 650. The cassette has a front side 651, a back side 652, a top side 653, and a bottom side 654. The sides are connected by a wall 655 that forms a closed perimeter around a body of the cassette. An interior space 656 is formed by the closed perimeter. The interior space of the cassette is adapted to accommodate sensing equipment, such as an RFID antenna 660 and/or one or more sensors. The cassettes may be dimensioned to contain a single RFID antenna, one or more sensors, such as a temperature, pressure and/or humidity sensors, or both the RFID antenna and/or one or more sensors. In the illustrated embodiment, a through hole 657 is provided in the wall of the cassette. An RFID antenna cable (not shown) may be fed through the through hole for connection to the RFID reader. Depending on the size of the cassettes, an additional amount of insulation may be added to the cassette on adjacent sides of the RFID antenna and/or one or more sensors contained therein. When provided, the additional insulation should be situated such that it does not interfere with and/or obscure a portion of the RFID antenna and/or one or more sensors.

Figure 7:
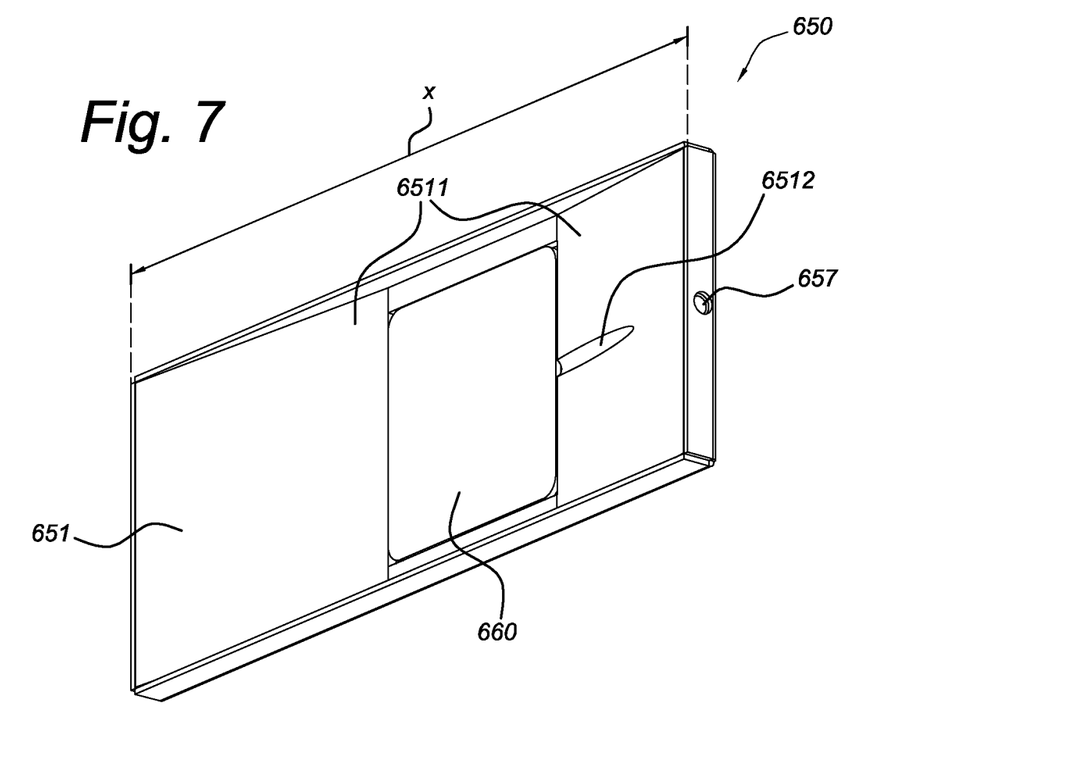
FIG. 7 is a front view of another exemplary cassette.
Figure 8:
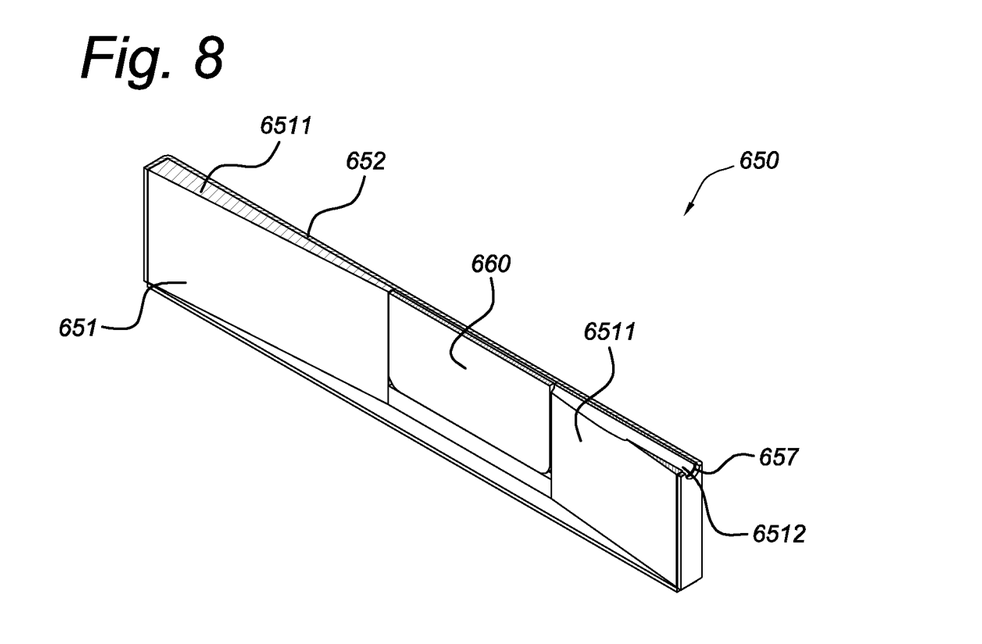
FIG. 8 is a cross-sectional view of the exemplary cassette of FIG. 7 taken along the line 'x'.

FIG. 7 shows another exemplary cassette 650. In the illustrated embodiment, the front side includes foam 6511. The foam is disposed in the interior of the cassette between the front side and the back side. The foam preferably surrounds the RFID antenna 660, but does not obscure any portion thereof on the front-facing side of the RFID antenna which is adjacent to the inner liner. A cable groove 6512 may be provided in the foam to streamline and/or guide the connection of the RFID antenna cable from the RFID antenna through the through hole 657. A cross-section of cassette 650 taken along the line 'x' of FIG. 7 can be seen in FIG. 8. The cassette 650 has the same features as the cassettes of FIGS. 6 and 7, including but not limited to, front side 651, back side 652, RFID antenna 660, and cable groove 6512, and additional insulation, which may comprise a foam material 6511, is shown in the interior space of the cassettes.

In one non-limiting example, the wall, the back side, the top and the bottom side of the cassettes are formed from a metallic material. Metallic materials, such as stainless steel, are particularly desirable for forming these portions of the cassettes because they will reflect RFID signal(s). In this regard, an RF signal may pass from the enclosed interior space through the front side of the cassette and to the RFID antenna. If the RF signal continues to pass through the interior space of the cassette until it reaches the back side of the cassette, it will be reflected back toward the interior space of the cassette once it contacts the back side.

The structure of and/or material used to form the cassette may also have an impact on the transmission and receipt of RF signals to and from the cassettes. Additionally for exemplary intelligent cabinets where the intermediate layer is an insulation layer, the thickness of the cassettes may have an impact on the level of insulation. Specifically, the thicker the cassette, the less insulating material there is in the insulating layer. Conversely, the thinner the cassette, the more insulating material there is in the insulating layer. In some embodiments, cassettes formed of stainless steel with a thickness of 0.5 mm is found to be particularly preferable for balancing the level of reflectiveness of the RF signals and reduction of material from the insulating layer.

In some embodiments, additional cassettes 170, 180 may also be provided along the top and bottom ends of the back side of the intelligent cabinet. The additional cassettes may be provided in a central portion of the respective top and bottom ends and positioned along a central longitudinal axis (Y) of the intelligent cabinet. The additional cassettes may be dimensioned similarly to the cassettes of the plurality of cassettes that are received in the plurality of slots formed in the intermediate layer and are similarly adapted to house RFID equipment and/or one or more sensors. When the additional cassettes are provided in the top and/or bottom ends of the intelligent cabinet, respective slots adapted to fittingly receive the additional cassettes may be provided in an intermediate layer, which may comprises a corrugated layer, of the top and/or bottom ends of the intelligent in the same manner as the plurality of slots previously described above.

A main cassette 160 is also provided at the back of the intelligent cabinet. The main cassette is arranged to contain an RFID reader that transits and receives signals from the RFID antennas. The main cassette may be mounted on or affixed to the back of the intelligent cabinet. The main cassette is preferably located in a centralized region of the back of the intelligent cabinet so that the plurality of RFID antennas contained in the plurality of cassettes can be easily connected to the RFID reader. Accordingly, each of the plurality of cassettes may be provided with at least one through hole dimensioned to accommodate an RFID antenna cable. When the main cassette is positioned in a centralized region of the back of the intelligent cabinet, all of the antenna cables extending from each RFID antenna can therefore be easily connected with the main cassette in the central region via cable guides formed the body of the cassettes and conveniently tethered together and/or neatly tucked away at the back of the intelligent cabinet.

As is shown in FIG. 1, the plurality of cassettes 150, the optional first and second additional cassettes 170, 180, and the main cassette 160 are all accessible from a back side of the intelligent cabinet. This configuration is particularly advantageous because each cassette can be easily and individually accessed for adjustment, repair, and/or replacement purposes with minimal or no impact to the operation of the equipment in the other cassettes.

Cassettes 150, 170, 180 are adapted to house RF equipment, including an RF antenna, and/or one or more sensors, such as temperature, pressure, and humidity sensors. In particular, the cassettes are designed preferably for use with UHF RFID systems. However, the cassettes are not specifically limited to use with UHF RFID systems and may also be equipped with HF RFID equipment, active RFID systems, microwaves, Bluetooth®, or other like systems that are compatible with radio waves.

The plurality of RFID antennas with which the cassettes may be equipped are not particularly limited to any specific RFID antenna. However, RFID antennas that have the following functional characteristics, in no particular order, have particular desirability: field size, (high) gain, (large angle) beamwidth, ease-of-assembly, low cost, frequency (ETSI and FCC), circular polarization, and directionality. Circular polarized antennas are particularly useful in that the RF tags/product and the RF reader do not need to be located on the same plane and/or at the same height. Further, circular polarized antennas do not require that the RF reader knows the orientation of the tag, which can be useful in the intelligent cabinet because the inventory may not necessarily always be oriented in the same direction, especially where a consumer may temporarily remove an item from the cabinet and then subsequently restock the same in a different orientation. High gain antennas are also considered to be desirable because they have a high level of functionality in high density RF tag environments and likewise in environments that contain liquid items, which can shield and/or obscure RF signals. RF antennas that support worldwide frequency coverage are also desirable so that the antennas do not need to be swapped in different geographic regions.

Another aspect of the present invention is an intelligent cabinet that is manufactured by: providing in a mold, a corrugated layer comprising a plurality of slots, each slot dimensioned to fittingly receive a corresponding cassette; injecting a foam material through the mold against the back side of the corrugated layer to form an intermediate layer, the foam material forming an airtight seal with the back side of the corrugated layer; removing the intermediate layer from the mold and attaching an inner liner over the front side of the corrugated layer; and providing an outer wall over the intermediate layer such that exposed foam of the intermediate layer is entirely covered by the outer wall. An intelligent cabinet according to the present invention can alternatively be manufactured by placing in a mold, the outer wall and the corrugated layer comprising a plurality of slots and the inner liner, the corrugated layer is arranged between the outer wall and the inner liner and a front side of the corrugated layer is in fitting engagement with the inner liner; injecting a foam material the space between the back side of the corrugated layer and the outer wall to form an airtight seal, and removing the composite structure from the mold.

It is desirable that the mold be formed of a material that is sufficiently rigid and strong to prevent deformation of the corrugated layer and also that can be easily and seamless removed from the composite structure following setting of the foam material. One exemplary material that has both of these characteristics is aluminium. Hydraulic rams may be provided to open and close the mold, as well as to hold the mold securely in position when the high pressure foam is added.

While the invention has been described herein by reference to certain embodiments, it is to be understood that modifications in addition to those described herein may be made to the structures and techniques described herein without departing from the spirit and scope of the invention. Accordingly, although specific embodiments have been described, they are examples only and are not limiting upon the scope of the invention.

The invention claimed is:

1. An intelligent cabinet for dispensing products contained therein, the intelligent cabinet comprising:
    an outer wall, an inner liner defining an enclosed interior space adapted for housing an inventory of items, the outer wall and inner liner being spaced apart by an intermediate layer provided therebetween and having a plurality of slots, and a system of modular cassettes comprising a plurality of cassettes, wherein each cassette is adapted to be fittingly received in and removable from a corresponding slot from the plurality of slots, and a plurality of RFID antennas, where each RFID antenna is separately housed in one of the cassettes from among the plurality of cassettes.

2. The intelligent cabinet according to claim 1, wherein the intelligent cabinet has a front side and a back side, where the inventory of items are accessible from the front side and the plurality of cassettes are accessible from the back side.

3. The intelligent cabinet according to claim 1, further comprising a main cassette containing an RFID reader.

4. The intelligent cabinet according to claim 1, wherein each cassette of the plurality of cassettes comprises at least one through hole dimensioned to accommodate an RFID antenna cable.

5. The intelligent cabinet according to claim 1, wherein each cassette is made of metal.

6. The intelligent cabinet according to claim 1, wherein the cassettes are positioned in the slots such that a space between the RFID antennas and the enclosed interior space is 2 cm or less.

7. The intelligent cabinet according to claim 1, wherein the intermediate layer comprises foam.

8. The intelligent cabinet according to claim 1, wherein a foam insulation is provided in one or more of the plurality of cassettes, the foam insulation being disposed adjacent to the RFID antenna in the cassette.

9. The intelligent cabinet according to claim 1, wherein the plurality of cassettes comprises at least 8 cassettes.

10. The intelligent cabinet according to claim 1, wherein the plurality of cassettes comprises around 50% or less but more than 10% of a total surface area of the intermediate layer.

11. The intelligent cabinet according to claim 10, wherein a foam is provided in the plurality of cassettes to offset a reduction in a total volume of the intermediate layer so that the reduction in total volume of the intermediate layer is less than 20%.

12. The intelligent cabinet according to claim 1, wherein the plurality of cassettes further comprises a first additional cassette positioned at a top end of the back side of the intelligent cabinet and/or a second additional cassette positioned at a bottom end of the back side of the intelligent cabinet, the first and second additional cassettes being positioned in a central portion of the respective top and bottom ends of the back side of the intelligent cabinet.

13. The intelligent cabinet according to claim 1, wherein the intelligent cabinet comprises a temperature controlled environment.

14. The intelligent cabinet according to claim 13, wherein the temperature controlled environment is one of a refrigerator, a freezer, or a heated cabinet.

15. The intelligent cabinet according to claim 1, wherein the intermediate layer further comprises a corrugated layer.

16. The intelligent cabinet according to claim 15, wherein the corrugated layer is a thin metal material with a thickness of between 0.3 mm and 0.7 mm.

17. The intelligent cabinet according to claim 1, wherein the inner liner comprises a plastic material.

18. The intelligent cabinet according to claim 1, wherein at least one of the plurality of cassettes comprises an RFID antenna and/or one or more additional sensors.

19. The intelligent cabinet according to claim 18, wherein the one or more additional sensors comprise a temperature sensor, pressure sensor, humidity sensor, an optical sensor, a camera, a light sensor, a laser, a motion sensor, a UV-c light, a radar sensor, an ultrasonic sensor, an audio sensor, one or more speakers, and/or a beamer.

20. A cassette for installation in the intelligent cabinet according to claim 1, comprising a front side, a back side, a top side, and a bottom side, the sides being connected by a wall forming a closed perimeter around a body of the cassette and forming an interior space, the interior space being adapted to receive an RFID antenna and/or an additional sensor, wherein the top side, bottom side, back side, and wall are formed of a metal, the front side is at least partially open or formed from a material adapted to permit RF signals to be transmitted from and received into the interior space, and during use, the cassette is oriented such that the front side faces the inner liner and the back side faces the outer wall.

* * * * *